July 31, 1934.                A. B. BELL                    1,968,434
                                CAR SEAT
                    Filed Jan. 12, 1933        3 Sheets-Sheet 2
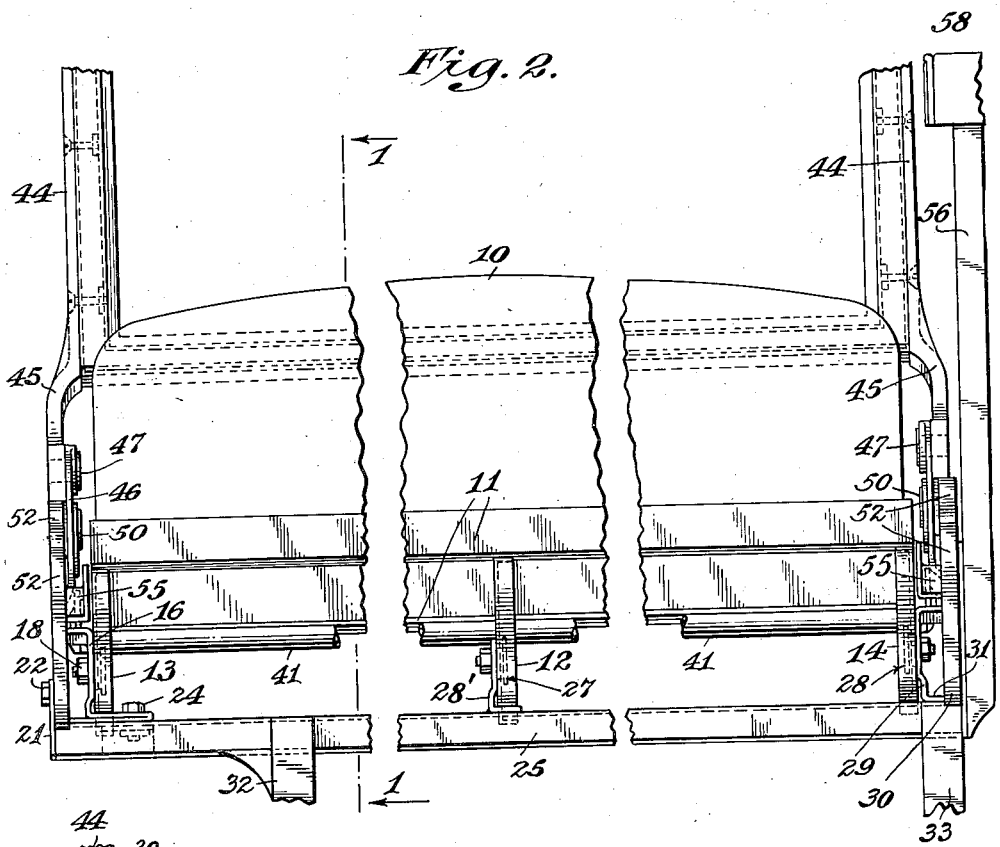
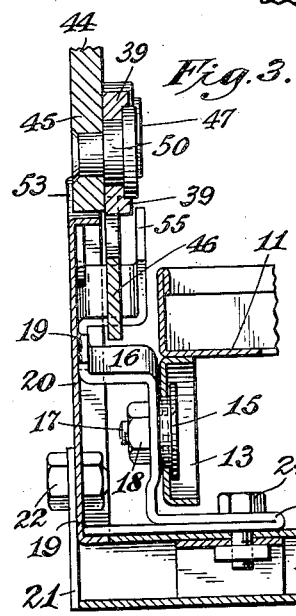
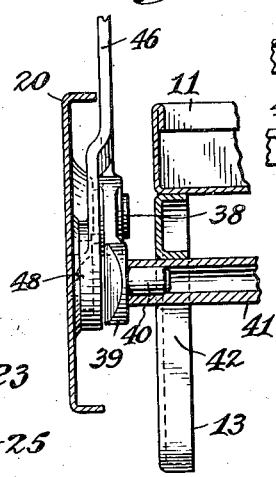
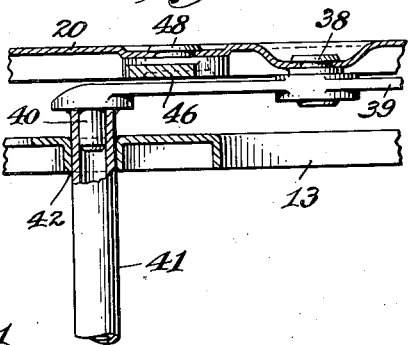
INVENTOR:
Alfred B. Bell
BY
          ATTORNEY July 31, 1934.  A. B. BELL  1,968,434
CAR SEAT
Filed Jan. 12, 1933   3 Sheets-Sheet 3
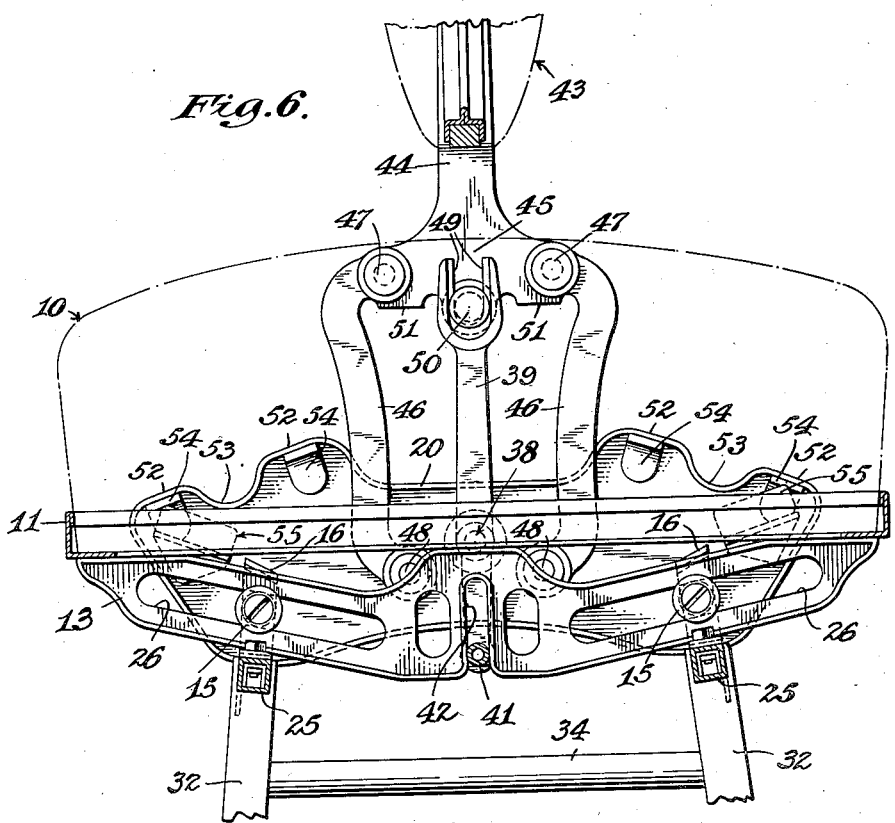
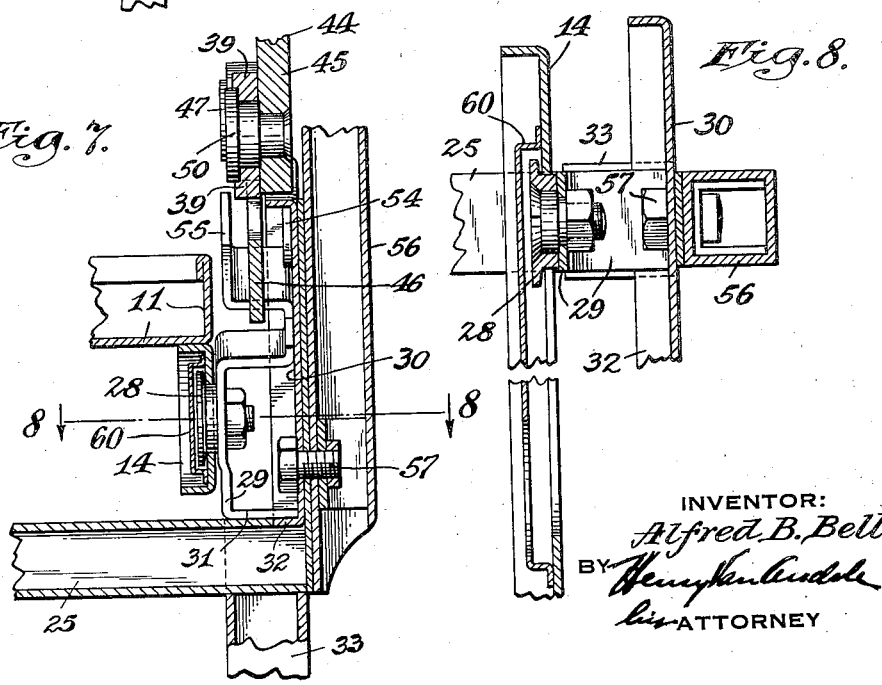
INVENTOR:
Alfred B. Bell
BY
ATTORNEY Patented July 31, 1934

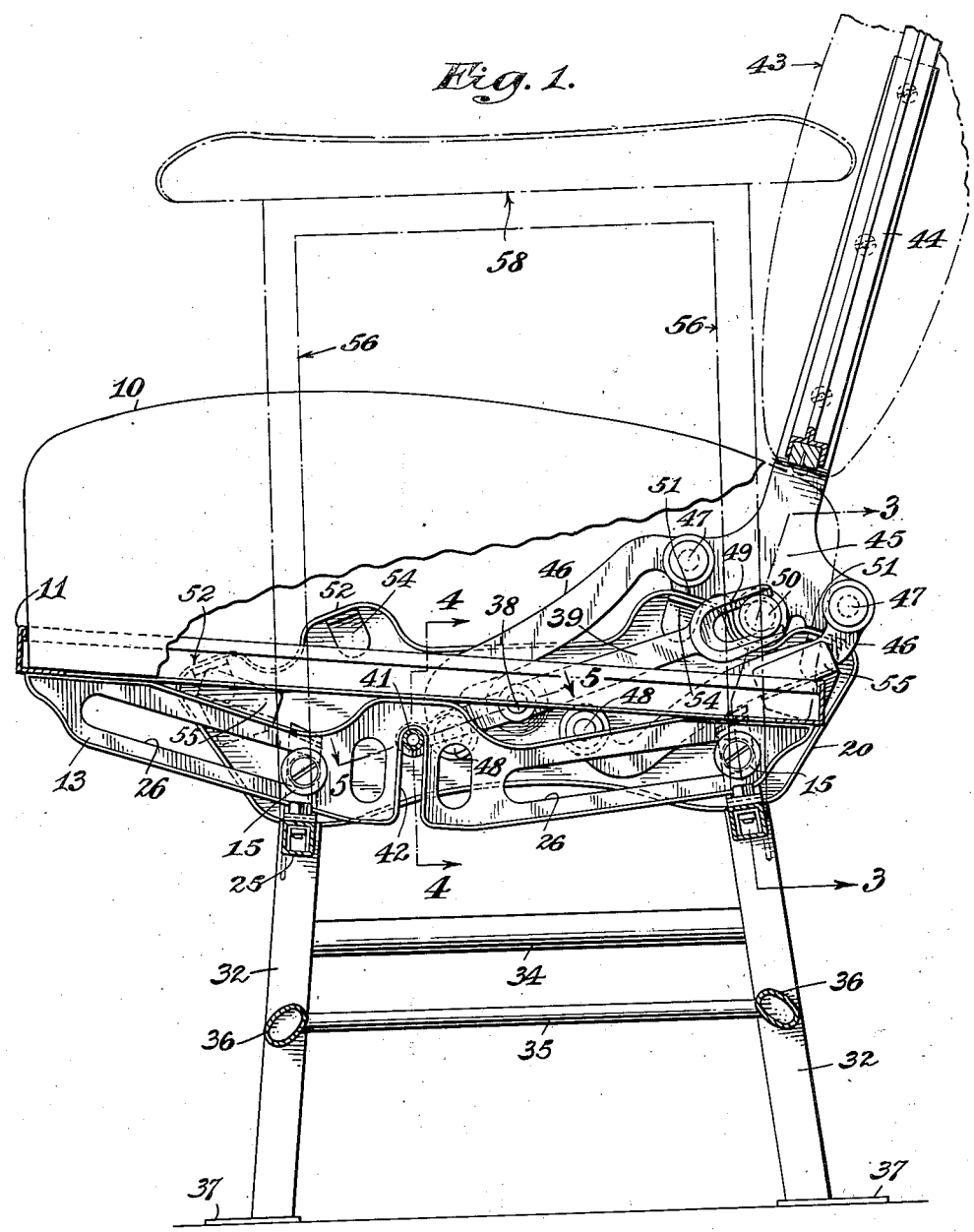

1,968,434

UNITED STATES PATENT OFFICE 1,968,434

CAR SEAT

Alfred B. Bell, Philadelphia, Pa., assignor to Hale & Kilburn Co., Philadelphia, Pa., a corporation of Delaware Application January 12, 1933, Serial No. 651,288

5 Claims. (Cl. 155—101)

This invention relates to car seats, and more particularly to car seats in which the seat back may be moved over the cushion from one side to the other to reverse the seating aspect of the seat, the seat cushion preferably at the same time shifting in a direction opposite to the movement of the back and assuming a slight backward tilt. Car seats of this type being commonly called "walkover" seats.

The principle object of this invention is to provide a "walkover" seat which constitutes an improvement over "walkover" seats as heretofore constructed; more especially as to lightness, simplicity, rigidity, durability and smoothness of action, as well as having more seat cushion throw, while at the same time occupying a more restricted area, leaving room and clear space for heating conduits to be installed along the side of a car against which the seat is mounted without interfering with the installation or reversal of the seat, allowing the top of the seat cushion to be at a comfortable height, and being of attractive appearance as a whole.

Another object of this invention is to provide a car seat of the "walkover" type, and one in which the back does not tend to be reversed when pressure is applied against the front edge of the seat cushion.

Further objects of this invention include the provision of a car seat of the "walkover" type in which a counterbalancing effect is exerted on the seat back as it drops into reversed position; and the provision of a "walkover" seat in which the amount of rise and fall of the seat back on reversal is minimized; and the provision of a seat of the "walkover" type having a center rocker as well as rockers toward each end, all to the end that lighter structural parts may be employed to obtain a lighter seat, without sacrifice of rigidity, durability, and strength, and smoother action is obtained.

Other objects of this invention will be in part obvious and in part pointed out hereinafter.

Accordingly this invention consists in the features of construction and the combination of elements and arrangement of parts, which will be exemplified in the construction hereinafter set forth, and the scope of the application of which will be indicated in the claims which follow.

In order that a clearer understanding of this invention may be had, attention is hereby directed to the accompanying drawings forming a part of this application, and illustrating certain possible embodiments of the invention, and in which:—

Fig. 1 is a transverse vertical sectional view of a car seat embodying this invention, and is taken on the line 1—1 of Fig. 2, certain parts being shown broken away and others indicated by dot and dash lines to more clearly bring out the assembly;

Fig. 2 is a front view thereof, certain parts being broken away;

Fig. 3 is an enlarged sectional view of a portion of the construction and is taken on the angular line 3—3 of Fig. 1;

Fig. 4 is a similar sectional view and is taken on the line 4—4 of Fig. 1;

Fig. 5 is an enlarged sectional view taken on the line 5—5 of Fig. 1;

Fig. 6 is a view similar to Fig. 1, but shows the intermediate position of the seat back and reversing mechanism;

Fig. 7 is a view similar to Fig. 3 showing the corresponding parts at the aisle end of the seat; and, Fig. 8 is an enlarged sectional view of a detail and is taken on the line 8—8 of Fig. 7.

Similar reference characters refer to similar parts throughout the several views of the drawings.

Referring to the drawings, the seat cushion 10 is supported in a rectangular frame 11, which rests on and is welded or otherwise secured to three rockers, one rocker 12 being at the center of the seat and the other rockers 13 and 14 being disposed toward the opposite ends of the seat. Rocker 13, which is at the wall end of the seat, is supported on flange rollers 15 which are rotatably supported on brackets 16 by means of bolts 17 and nuts 18. Brackets 16 at the upper ends abut and are welded as at 19 to the seat end plate 20, which is secured to the car wall member 21 as by being bolted thereto as at 22. The lower portion of brackets 16 are doubled upon themselves as at 23 and there secured as by bolts 24 to one of the connecting rails 25. Each of rollers 15 penetrates one of the rocker slots 26 in the rocker 13, and it will be noted that these slots are shown to be straight and not curved or recessed at their ends, as has been suggested heretofore. The center rocker 12 has slots similar to the slots 26 of rocker 13 and is similarly supported on rollers 27 similar to the rollers 15 and supported on brackets 28' resting on and welded or otherwise secured to the connecting rails 25. At the aisle end of the seat the rocker 14, having slots similar to slots 26, is supported on rollers 28 mounted on brackets 29, which at their upper ends rest against and are welded or otherwise secured to the aisle end plate 30 and have a flange 31 at their lower ends resting on the end of the connecting rail 25 and the inturned bottom edge 32 of end plate 30. Connecting rails 25 are supported on suitable legs, one pair 33 of which may be at the extreme aisle end of the seat and the other pair 32 may be spaced inwardly some distance from the wall end to permit of the installation of heating pipes (not shown) along the side of the car wall against which the seat is installed. The corresponding front and rear legs may be connected and braced by suitable cross members, such as 34, and the corresponding legs at opposite ends of the seat may be connected and braced by tubular members such as 36, which may be oval in cross section and may serve as foot rests for occupants of adjacent seats, and cross-braced at their center by cross member 35 to prevent any flexing of the members 36 when so used. Preferably each leg is provided with a foot 37 whereby the seat may be fastened securely to the floor of the car in which the seat is installed.

At the center of each seat end is a stud 38 on which is pivotally supported a throw lever 39 intermediate its ends. The lower end of each throw lever has a stud 40 which enters into an end of a tubular oscillating rod 41, the opposite ends of rod 41 being welded to the pins 40 and lower extremities of the opposite throw lever 39. Oscillating rod 41 extends through the vertical slots 42 provided at the center of each of the rockers 12, 13 and 14.

The seat back 43 is secured to and supported at each end by a supporting arm 44 which has an extended portion 45 at its lower end below the bottom of the back cushion. Each supporting arm 44 is connected to each seat end plate by a pair of complementary links 46 pivotally secured at their upper ends to studs 47 carried on the extended portion 45 of each back supporting arm 44 and disposed equidistantly on opposite sides of the center line of the seat back. The lower ends of the complementary links 46 pivotally are supported on studs 48 secured to each seat end plate equidistantly on opposite sides of and lower than the stud 38 on which the throw lever 39 is pivoted. The upper end of throw lever 39 is bifurcated as at 49 and slidably and rotatably embraces a stud 50 provided at the center of each extended portion 45 of each back supporting arm 44 and lower than the studs 47 to which the upper ends of the links 46 are connected.

The periphery of each end plate 20 and 30 is flanged over inwardly and its top is so shaped that when the seat back is in reversed position flat portions 51 on the bottom of each extended portion 45 of the back supporting arms 44 will rest on complementary flat portions 52 of the peripheral flange of each end plate and the downwardly extending portion of each back supporting arm intermediate the portions 51 will seat in a depression 53 in the top of each seat end intermediate the seating surfaces 52. Preferably angle pieces 54 are secured to the seat ends to reenforce the seating portions 52. Also other angle plates 55 are preferably secured to each seat end plate adapted to prevent side movement of the rearward links 46 when the back is in either reversed position. At the aisle end of the seat an arm rest structure 58 may be provided having tubular uprights 56 secured as by bolts 57 to the adjacent end plate 30.

If desired, each rocker slot 26 may be covered by a plate, such as shown at 60 in Fig. 8, which would act both as a guard and a stiffener.

It will be noted that in the construction the links 46 do not cross or overlap the throw lever 39 at any time. Also that the throw lever and links are shorter than has heretofore been possible in other constructions, thus obtaining a lower amount of lifting of the back when the back is reversed.

By locating the pivot 50 of the upper end of the throw lever 39 below the pivots 47 for the upper ends of the links 46, and locating the throw lever pivot 38 above the pivots 48 for the lower ends of the links 46, the throw lever swings through a greater arc and is made to lie much flatter when the back is in either extreme position than when the pivot 50 is relatively higher or the pivot 38 is relatively lower, and this results in a number of outstanding advantages and improvements. For instance, there is a greater swing given the oscillating rod 41, thus giving the same amount of cushion throw with a shorter throw lever than would be possible otherwise. Also, in seating position the oscillating rod is brought nearer to the elevation of the pivot 38 than is possible otherwise, and, in fact, in the embodiment shown and described, the elevation of the oscillating rod is so near the elevation of the pivot 38 that the leverage component between the pivots 41 and 38 is so reduced that any amount of pressure against the front of the seat cushion which would be likely to be applied in the ordinary use and occupation of the seat will not dislodge the seat back, and curved or notched rocker slots are not required to avoid such undesirable seat back movement, and the rocker slots may be straight instead, which, furthermore, make the shifting of the seat easier and smoother, since the resistance of notches or shoulders to dislodgment of parts and resistance and friction due to curved contours is eliminated. Furthermore, in applicant's construction, the forward thrust of the oscillating rod against the rockers counterbalances the drop of the back as it assumes fully reversed position. By providing three rockers, not only each rocker but also the cushion frame may be made exceedingly light and still provide strength, rigidity, and durability. By reducing the drop of the back and counterbalancing the weight of the back as it drops into fully reversed position the force of the impact on the seat ends is greatly reduced and allows the end plates to be light and simple without sacrificing sturdiness or durability. The construction also renders it convenient for the rockers to be welded to the cushion supporting frame, thus making a combined unit. The entire reversing mechanism is confined entirely to the space above the connecting rails, and these connecting rails can be positioned quite close to the cushion supporting frame and there is an extensive open space beneath, and such space as will permit a heating conduit to be installed along the side of the car against which the seat is placed without interfering with the operation of the seat. It will also be noted that the construction allows the top of the cushion to be of comfortable height.

The construction is such that high tensile steel may be employed. Heretofore reversible seats of the walk-over type have necessarily weighed 90 to 100 pounds each. The present invention makes it possible to reduce the weight to 44 pounds and at the same time securing a seat that is extremely sturdy, rigid, and durable, having smooth action and requiring less effort to reverse. The reduction in the weight and the compacting of the reversing mechanism into the more restricted area is of utmost importance in this art.

As many changes could be made in the above construction and as many apparently widely different embodiments of this invention could be made, without departing from the scope thereof, it is understood that all matter contained in the foregoing description or shown in the accompanying drawings be interpreted as illustrative and not in a limiting sense.

What I claim is:

1. In a reversible car seat of the character described, in combination, an end plate, a seat back, a throw lever pivotally connected to the end plate and slidably pivoted to the seat back, and a pair of links disposed on opposite sides of the throw lever, pivotally connected to the back above the pivotal connection of the throw lever to the back and pivotally connected to the end plate below the pivotal connection of the throw lever to the end plate.

2. In a reversible car seat of the character described, in combination, an end plate, a seat back, a throw lever pivotally connected to the end plate and slidably pivoted to the seat back, and a pair of links disposed on opposite sides of the throw lever, pivotally connected to the back above the pivotal connection of the throw lever to the back and pivotally connected to the end plate below the pivotal connection of the throw lever to the end plate, said links being bowed outwardly from the throw lever so as not to cross the throw lever in any position of the seat back on the seat.

3. In a reversible seat of the character described, in combination, opposite end plates, rails connecting said plates, a rocker bracket mounted on each end of each rail and secured to the adjacent end plate, a rocker bracket mounted on each rail at its center, a rocker roller on each bracket, a rocker shiftably supported on the rollers at the center of said rails and a rocker at each end of the rails shiftably supported on the rollers thereat, a cushion-supporting frame supported on said rockers, each rocker having a vertical slot at its center extending upwardly from its lower edge, a throw lever pivoted on each end plate, and an oscillating rod carried on and connecting said throw levers and extending through the said vertical slots in said rockers, whereby said rockers are shifted across said rails when the throw levers are thrown.

4. In a reversible car seat of the character described, in combination, an end plate, a throw lever pivotally connected to the end plate and having a slot at its upper end, a seat back having a pivot stud slidably and pivotally engaging in said throw lever slot, and a pair of links disposed on opposite sides of the throw lever, pivotally connected to the back above said pivot stud and pivotally connected to the end plate below the pivotal connection of the throw lever to the end plate.

5. In a reversible car seat of the character described, in combination, an end plate, a throw lever pivotally connected to the end plate and having a slot at its upper end, a seat back having a pivot stud slidably and pivotally engaging in said throw lever slot, and a pair of links disposed on opposite sides of the throw lever, pivotally connected to the back above said pivot stud and pivotally connected to the end plate below the pivotal connection of the throw lever to the end plate, said links being bowed away from the throw lever at both their upper and their lower ends so as not to cross the throw lever in any position of the seat back on the seat.

ALFRED B. BELL.